US005749218A

United States Patent [19]
Cromer et al.

[11] Patent Number: 5,749,218
[45] Date of Patent: May 12, 1998

[54] WEAR REDUCTION KIT FOR GAS TURBINE COMBUSTORS

[75] Inventors: Robert H. Cromer, Johnstown, N.Y.; Kenneth B. Potter, Simpsonville, S.C.

[73] Assignee: General Electric Co., Schenectady, N.Y.

[21] Appl. No.: 535,864

[22] Filed: Sep. 28, 1995

Related U.S. Application Data

[63] Continuation-in-part of Ser. No. 169,134, Dec. 17, 1993, abandoned, Ser. No. 169,135, Dec. 17, 1993, abandoned, Ser. No. 169,133, Dec. 17, 1993, abandoned, Ser. No. 169,120, Dec. 17, 1993, abandoned, and Ser. No. 169,121, Dec. 17, 1993, abandoned.

[51] Int. Cl.⁶ ............................................. F02C 7/20
[52] U.S. Cl. ..................... 60/39.31; 60/39.37; 60/740; 60/909
[58] Field of Search ........................... 60/39.02, 39.31, 60/39.32, 39.37, 39.75, 740, 748, 752, 909; 416/241 R; 165/81, 82; 285/173, 329, 422, 916

[56] References Cited

U.S. PATENT DOCUMENTS

| H903 | 4/1991 | Weinstein . | |
|---|---|---|---|
| 2,611,243 | 9/1952 | Huyton . | |
| 2,729,938 | 1/1956 | McDowall et al. . | |
| 2,965,303 | 12/1960 | Jackson . | |
| 3,186,168 | 6/1965 | Ormerod et al. . | |
| 3,701,552 | 10/1972 | Cowan . | |
| 3,759,038 | 9/1973 | Scalzo et al. . | |
| 3,980,233 | 9/1976 | Simmons et al. . | |
| 4,028,788 | 6/1977 | DeMusis . | |
| 4,076,343 | 2/1978 | McCloskey . | |
| 4,124,737 | 11/1978 | Wolfa et al. | 428/640 |
| 4,141,127 | 2/1979 | Cretella et al. . | |
| 4,215,181 | 7/1980 | Betts | 428/591 |
| 4,249,372 | 2/1981 | White | 60/39.32 |
| 4,295,615 | 10/1981 | Mishek . | |
| 4,406,501 | 9/1983 | Christensen . | |
| 4,465,284 | 8/1984 | Szema | 277/22 |
| 4,625,810 | 12/1986 | Edmission . | |
| 5,066,546 | 11/1991 | Materkowski . | |

(List continued on next page.)

OTHER PUBLICATIONS

"Metals for Supersonic Aircraft and Missiles", American Society for Metals, Cleveland, Ohio, 1958, pp. 234–237.

Primary Examiner—Timothy Thorpe
Assistant Examiner—Ted Kim
Attorney, Agent, or Firm—Nixon & Vanderhye

[57] ABSTRACT

A wear reduction kit for a combustion system of a gas turbine includes:

a) a plurality of U-shaped inserts for use with a gas turbine transition piece having a peripheral end frame at one end thereof, the peripheral end frame having a continuous peripheral slot therein, open in a radially outward direction wherein the plurality of U-shaped inserts are adapted for insertion within the peripheral slot, and further wherein the U-shaped inserts are formed of material having a hardness greater than the end frame;

b) at least a pair of guide block elements for use in securing a transition piece of a gas turbine combustor to a transition piece support, wherein each of the guide block elements is secured to the transition piece and adapted for engagement with cooperating guide finger elements secured to the support; and at least a pair of covers for the guide finger elements, and wherein the guide blocks are formed of material having a hardness greater than the finger element covers; and c) cooperating combustor flow sleeve and combustor liner stop elements wherein the first stop element is adapted to be secured to a combustor flow sleeve and the liner stop element is adapted to be secured to a combustion liner, wherein the first and second stop elements have cooperating engagement surfaces, the engagement surfaces of the flow sleeve stop element having a hardness less than the engagement surfaces of the liner stop element.

14 Claims, 11 Drawing Sheets

U.S. PATENT DOCUMENTS

| | | | |
|---|---|---|---|
| 5,073,084 | 12/1991 | Hirst | 415/209.3 |
| 5,094,800 | 3/1992 | Bierwirth et al. | |
| 5,154,577 | 10/1992 | Kellock et al. | |
| 5,160,243 | 11/1992 | Herzner et al. | 416/220 R |
| 5,167,223 | 12/1992 | Koros et al. | |
| 5,224,555 | 7/1993 | Bain et al. | |
| 5,238,365 | 8/1993 | Petsche. | |
| 5,265,412 | 11/1993 | Baepalli et al. | 60/39.32 |
| 5,289,677 | 3/1994 | Jarrell. | |
| 5,310,009 | 5/1994 | Rowlett. | |
| 5,320,690 | 6/1994 | Beltran et al. | |
| 5,323,600 | 6/1994 | Munshi. | |
| 5,361,577 | 11/1994 | Cromer | 60/39.32 |

WEAR REDUCTION KIT FOR GAS TURBINE COMBUSTORS

This application is a C-I-P of Ser. No. 08/169,134 filed Dec. 17, 1993, now abandoned and a C-I-P of Ser. No. 08/169,135 filed Dec. 17, 1993, now abandoned and a C-I-P of Ser. No. 08/169,133 filed Dec. 17, 1993, now abandoned and a C-I-P of Ser. No. 08/169,120 filed Dec. 17, 1993, now abandoned and a C-I-P of Ser. No. 08/169,121 filed Dec. 17, 1993, now abandoned.

TECHNICAL FIELD

This invention relates to gas turbines in general, and to an improvement in the wear characteristics at the interfaces of various combustion system components subject to wear as a result of combustion noise induced vibrations.

BACKGROUND AND DISCLOSURE OF THE INVENTION

In a typical multiple combustion system for a gas turbine, several cylindrical combustors are arranged in a circular array and deliver hot combustion gases to the turbine first stage. Each combustor includes one or more fuel nozzles; a fuel injection system; a combustion chamber defined by a combustion liner; a flow sleeve or flow shield surrounding and radially spaced from the liner; and a transition piece connected to and extending between the combustion chamber and the first stage of the turbine. The liner and flow sleeve define a passage between them for compressor discharge air to be reverse flowed to the upstream end of the combustor where the air is introduced into the combustion liner for mixing with fuel introduced by the one or more fuel nozzles. The transition piece delivers the hot combustion gases to the turbine first stage.

Several combustion component interfaces have been identified in which combustion induced wear is problematic. The degree of this wear at the variously identified interfaces limits combustion inspection intervals and thus increases down time and related repair costs. A description of the component parts subject to such wear and the solution proposed by this invention, including the composition of a wear upgrade kit for gas turbines, follows below.

1. A transition piece or duct is provided for each combustor of the gas turbine combustion system. The transition piece comprises an open-ended tubular member which typically varies in cross sectional shape from circular at the combustor end to a generally curved rectangular shape at the turbine end. The turbine end of the transition piece is provided with a separate or integral "frame" defining the turbine end opening. In conventional constructions, an aft mount is welded to and protrudes from the transition piece immediately upstream of the end frame, and is arranged for connection to a bracket fixed to the turbine first stage. The end frame itself is provided with a U-shaped peripheral slot for receiving a pair of conventional floating seals and a pair of conventional end seals utilized in connecting the transition piece to the turbine first stage. These seals, which are constructed of a Cobalt based alloy sheet material, exhibit both sliding and rotating movement within the slot, wearing against the softer Nickel based alloy (e.g., NIMONIC-263) of the transition piece end frame. Such wear is both difficult and expensive to repair.

Hard facing metal sprays are not a solution to this problem because of the inability to deposit a uniform coating within the narrow slot. In accordance with one object of this invention, wear inside the transition piece end frame slot is reduced through the use of Cobalt alloy sheet material inserts, harder than the end frame material but similar in composition to the seal material, to line the U-shaped slot. Because these inserts can be preformed and welded within the slot, repair and replacement costs are reduced. In addition, the wear at the slot/seal interface is shifted away from the end frame slot to the replaceable and relatively inexpensive inserts and thus, not only is the overall wear at the interface with the seals reduced, but repair costs are also significantly reduced.

2. The rectangular or turbine end of the transition piece is also connected to the combustion liner. In current combustion systems, wear is exhibited on a plurality of H-shaped HS-188 guide blocks and a corresponding plurality of stainless steel guide finger elements located at the interface of the transition piece and the combustion liner. More specifically, at this interface each H-shaped guide block secured to the transition piece is adapted to receive a pair of guide fingers of a corresponding guide finger element mounted on a forward transition piece support which, in turn, is secured to the turbine compressor discharge casing.

Here again, hard facing metal sprays have been employed but with only limited success. Moreover, sprayed on coatings tend to chip away from the underlying surface during use. As a practical matter, it is difficult to insure uniform spray patterns, particularly where fastener interfaces are concerned which often have hard to access surfaces, grooves, etc. As a result, maintenance intervals have not been positively impacted by the use of such sprays.

It is another object of this invention, therefore, to provide more acceptable and predictable wear characteristics, particularly at the interfaces of transition piece guide blocks and cooperating combustion liner guide finger elements. This is accomplished by careful selection of wear resistant materials, and by shifting the majority of the wear to removable and replaceable covers fixed to the guide finger elements. More specifically, this invention relates to the selection of a harder, more wear resistant material for the transition piece H-blocks, and to the attachment of hard, wear resistant covers to surfaces of the guide finger elements which engage the H-shaped guide blocks. These covers, while harder than the underlying stainless guide finger elements, are nevertheless softer than the material chosen for the transition piece H-blocks. By thus reducing overall wear, and by making wear related repairs easier through the use of inexpensive and easily replaceable wear covers, the combustion system reliability is greatly enhanced, inspection intervals are increased, and repair costs are reduced.

3. The combustion liner of the gas turbine combustion system is concentrically located within the flow sleeve and radially inwardly spaced therefrom. The upstream or rearward end of the combustion liner is provided with a plurality of circumferentially spaced liner stops which are designed to cooperate with a corresponding number of flow sleeve stops which together insure proper radial and axial location of the combustion liner within the flow sleeve, and which also prevent the combustion liner from moving in an axially downstream direction, i.e., toward the transition piece.

In current combustion systems, wear is exhibited on both the HAST-X combustion liner stops and on the cooperating carbon steel flow sleeve stops. It has been attempted to utilize hard facing sprays to improve the wear characteristics at the interface of the liner stops and flow sleeve stops, but as mentioned above, this approach has enjoyed little success, and combustion inspection intervals have not been positively impacted. This is particularly true in relation to components which include slots or grooves, which cannot be acceptably coated by spraying. It is another object of this invention to provide more acceptable and more predictable wear characteristics which will yield longer service intervals and therefore reduce downtime and wear related repair costs.

To this end, this invention utilizes a harder, more wear resistant material for the combustion liner stops, and also makes use of U-shaped wear strips that are attached to the flow sleeve stops. These wear strips are harder than the flow sleeve stops but softer than the liner stops. The wear strips and liner stops are constructed of materials which form a good "wear couple". This configuration reduces overall wear, but also causes the wear to take place predictably and predominantly in the replaceable U-shaped strips, thus reducing wear on the combustion liner stops. Because the flow sleeve stops are considerably easier and less costly to repair and/or replace than the combustion liner stops, the overall wear characteristics are greatly enhanced, and wear related repair costs are reduced.

In more specific terms, the carbon steel flow sleeve stops currently in use are in the shape of a structural T when viewed in side elevation or section. In fact, each flow sleeve stop includes an elongated substantially rectangular stem and a round disk-like head fixed to the top of the stem. The length of the stem corresponds substantially to the diameter of the head. A plurality of such stops are welded inside the combustor flow sleeve, with the disk-like portion received in corresponding counterbored holes in the sleeve. In this way, the stems project radially into the interior of the flow sleeve for cooperating engagement with stops mounted on the combustion liner.

The cooperating HAST-X combustion liner stops each include a substantially elongated U-shaped element, with one end of a center slotted portion of the element closed. The liner stops are welded to the exterior surface of the combustion liner in circumferentially spaced locations, in substantial alignment with the flow sleeve stops. The liner stops are welded to the liner with their open ends facing in a downstream direction, i.e., in the direction of the transition piece, and with their closed ends adapted to engage in abutting relationship with respective rearward facing ends of the flow sleeve stop stems.

The invention here relates to the use of a harder, high temperature and wear resistant Cobalt-based alloy for the liner stops, and the attachment of a U-shaped wear strip to the exterior surface of each flow sleeve stop stem, so that the wear strip complements the interior U-shape of the liner stop, as will be explained in greater detail below. This wear strip is also constructed of a Cobalt-based alloy which, while harder than the carbon steel stem of the flow sleeve stop, is nevertheless softer than the alloy material used for the liner stop. Thus, because the liner stop is harder than the wear strip, wear takes place predictably and predominantly on the more easily replaceable wear strips of the flow sleeve stops.

4. In conventional gas turbine combustion systems, the tip of each fuel nozzle engages a combustion liner cap or cowl assembly, including the substantially cylindrical, tubular liner extending forwardly of the nozzle. As already noted, the flow sleeve or flow shield surrounds the liner such that compressor discharge air can be reverse flowed between the flow shield and liner and then introduced into the combustion chamber defined by the liner.

In such conventional systems, wear is experienced at the interface of the combustion liner cap or cowl assembly hardware (which may include a mounting ring) and the outer collar (which may be in the form of an air swirler) of the fuel nozzle gas tip. Typically, the liner cap assembly hardware is constructed of a high temperature material known in the trade as HS-188. At the same time, the fuel nozzle, including the nozzle collar, are usually formed of stainless steel. The wear patterns that are experienced are exhibited on both the liner cap assembly hardware and the outer collar or air swirler of the fuel nozzle tip.

By judicious selection of wear resistant materials, and by causing the wear patterns to be exhibited predictably and primarily on one component, (that component which is more easily accessible and repairable and/or the least expensive to replace), combustion system reliability is greatly enhanced, service intervals can be lengthened and labor costs reduced. To this end, it is another object of this invention to enhance wear characteristics at the fuel nozzle gas tip/combustion liner interface.

In accordance with the exemplary embodiment of the invention, a harder, more wear resistant material is used for the liner cap assembly hardware. In addition, weld buildup material is deposited on the peripheral surface of the fuel nozzle gas tip collar or swirler, and this weld buildup material is comprised of an alloy which is harder than the fuel nozzle tip but softer than the material used for the combustion liner cap assembly hardware. In the exemplary embodiment, the weld material is deposited continuously about the outer collar or swirler, and then machined to provide circumferentially spaced gaps or cuts which allow for differential thermal expansion as between the nozzle tip and the harder weld material. This arrangement, when combined with the use of harder material for the liner cap assembly hardware, transfers most of the repairs onto the relatively easily removable and/or replaceable fuel nozzle as opposed to the more expensive to repair combustion liner assembly.

5. Finally, conventional gas turbine combustion ignition systems use spark plugs, crossfire tubes and flame detectors. Ignition in one of the chambers produces a pressure rise which forces hot gases throughout the crossfire tubes which extend between adjacent liners, thereby substantially simultaneously propagating ignition to all other combustion chambers.

In current combustion systems, wear is exhibited on both the combustion liner's crossfire tube collar and on the crossfire tube itself.

Once again, hard-facing metal sprays have been employed to reduce wear, but with only limited success for the reasons noted hereinabove. As a result, maintenance intervals have not been positively impacted by the use of such sprays.

It is therefore still another objective of this invention to provide more acceptable and predictable wear characteristics, particularly at the interfaces of crossfire tubes and combustion liner crossfire tube collars. This is accomplished by careful selection of wear resistant materials, and by shifting the majority of the wear to the crossfire tubes rather than the liner collars. Accordingly, wear patterns are enhanced and more predictable, and related repairs are less expensive due to the ease with which the crossfire tubes are repaired and/or replaced as compared to the combustion liner. Moreover, crossfire tubes are less costly in and of themselves, thus reducing replacement costs.

In an exemplary embodiment of the invention, the conventional liner crossfire tube collar is axially shortened by about ¼ inch by machining or other suitable means, and a harder, wear resistant Cobalt-based alloy ring is welded onto the free end of the collar. Since the collar ring is harder, and thus more wear resistant than the crossfire tube end, the wear that does occur is exhibited on the crossfire tube end and not on the liner collar.

Because all of the above described components relate to the gas turbine combustion system, it has been found advantageous to address simultaneously the wear problems at all five interfaces described above simultaneously. To facilitate the repair process, it has been found cost effective and efficient to provide a repair kit which enables some or all of the wear induced problems described above to be remedied as described.

In its broader aspects, therefore, the invention here relates to a wear reduction kit for a combustion system of a turbine comprising:

a) a plurality of U-shaped inserts for use with a gas turbine transition piece having a peripheral end frame at one end thereof, the peripheral end frame having a continuous peripheral slot therein, open in a radially outward direction wherein the plurality of U-shaped inserts are adapted for insertion within the peripheral slot, and further wherein the U-shaped inserts are formed of material having a hardness greater than the end frame;

b) at least a pair of guide block elements for use in securing a transition piece of a gas turbine combustor to a transition piece support, wherein each of the guide block elements is secured to the transition piece and adapted for engagement with cooperating guide finger elements secured to the support; and at least a pair of covers for the guide finger elements, and wherein the guide blocks are formed of material having a hardness greater than the finger element covers; and c) cooperating combustor flow sleeve and combustor liner stop elements wherein the first stop element is adapted to be secured to a combustor flow sleeve and the liner stop element is adapted to be secured to a combustion liner, wherein the first and second stop elements have cooperating engagement surfaces, the engagement surfaces of the flow sleeve stop element having a hardness less than the engagement surfaces of the liner stop element.

Additional objects and advantages of the invention will become apparent from the detailed description which follows.

BEST MODE FOR CARRYING OUT THE INVENTION

Figure 1:
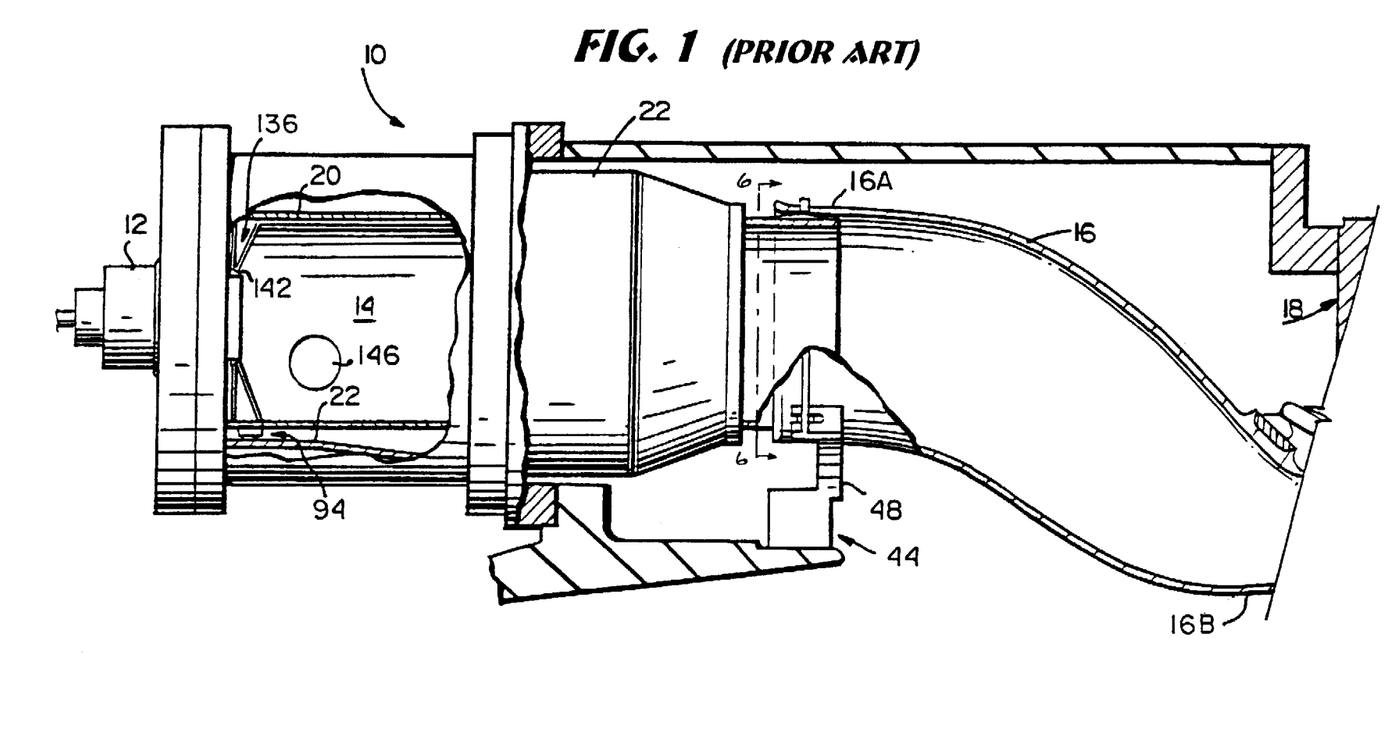
FIG. 1 is a side elevation, partly in section, illustrating a conventional combustor for a gas turbine.

With reference now to FIG. 1, a conventional combustor 10 in a multiple combustor gas turbine includes generally a fuel nozzle 12 (some gas turbines employ multiple nozzles in each combustor), a combustion chamber 14 and a transition piece 16 extending between the combustion chamber and the turbine first stage 18. The combustion chamber 14 is defined by a substantially cylindrical combustion liner 20 which, in turn, is surrounded by a substantially cylindrical flow sleeve 22. The radial space between the flow sleeve 22 and the liner 20 provides an air flow passage so that compressor discharge air can be reverse flowed to the upstream end (or nozzle end) of the liner 20 and then introduced into the combustion chamber for mixing with fuel supplied by the nozzle 12.

Figure 1A:
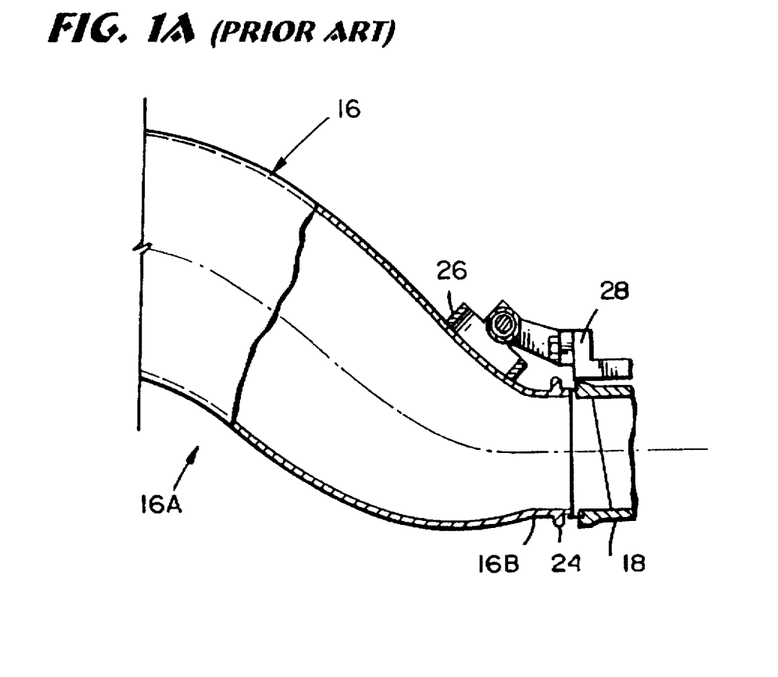
FIG. 1A is a side view, partially in section, of a conventional gas turbine transition piece extending between a combustor and a first turbine stage.
Figure 2:
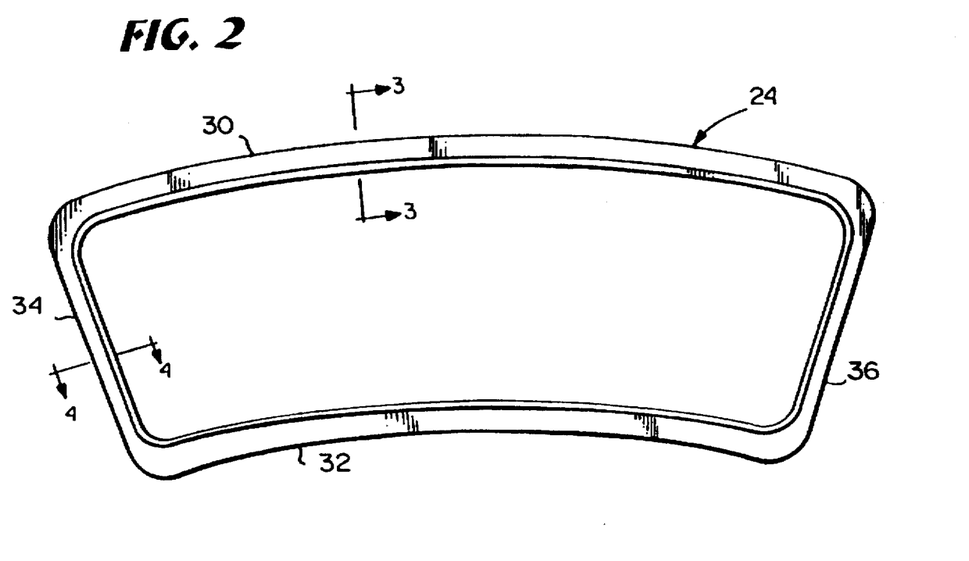
FIG. 2 is a front elevation of the end frame section of the transition piece in accordance with this invention.

With reference now also to FIGS. 1A and 2, the transition piece 16 in accordance with this invention includes an upstream or combustor end 16A and a forward or turbine end 16B which connects to the first stage 18 of the gas turbine. The transition piece 16 is an open-ended tubular duct which changes in cross section from substantially circular at the combustor end 16A to a generally curved, rectangular shape at the turbine end 16B. The latter is formed with an integral (or separate) frame 24 (formed by a peripheral, radially outwardly extending flange) surrounding the substantially rectangular flow opening therein. An aft mounting member 26 is welded to and protrudes from the transition piece body upstream of the end frame 24 and is adapted for connection to a bracket 28 secured to the first turbine stage 18.

Figure 3:
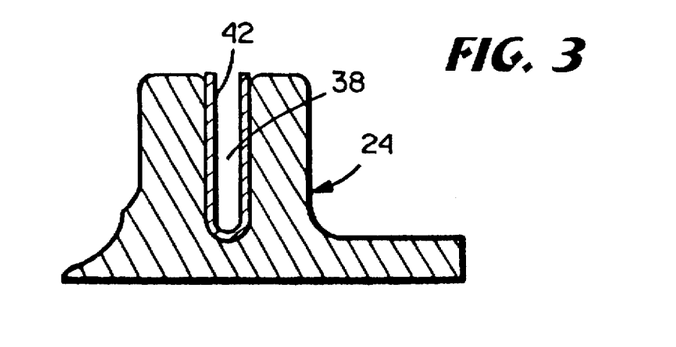
FIG. 3 is a part section taken along the line 3—3 of FIG. 2 and illustrating the wear enhancement feature of the present invention.
Figure 4:
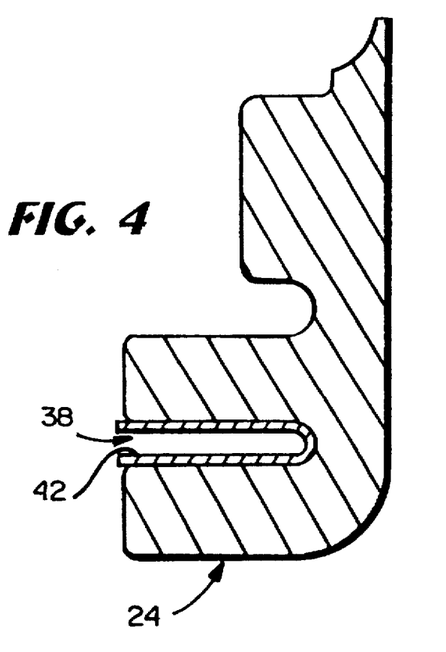
FIG. 4 is a part section view taken along the line 4—4 of FIG. 2, again illustrating the wear enhancement feature of the present invention.

With reference to FIGS. 2, 3 and 4, the end frame 24 which defines the rectangularly shaped flow opening of the transition piece 16 includes generally substantially horizontal (as viewed in FIG. 2) portions 30 and 32 as well as inclined side portions 34 and 36. Within this end frame, there is formed a U-shaped slot 38 (see FIGS. 3 and 4) extending continuously about the periphery of the end frame 24, and opening radially outwardly to enable the slot 38 to receive a plurality of seals (one shown at 40 in FIG. 5) used in conjunction with the transition piece/turbine stage interface.

Figure 5:
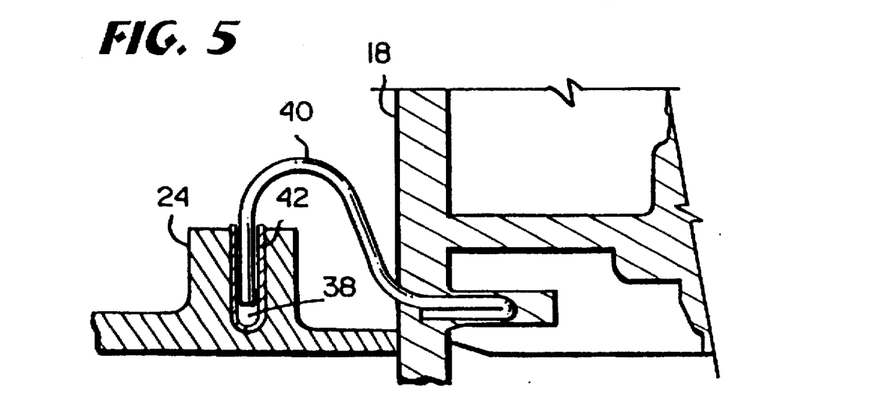
FIG. 5 is a part section view similar to FIG. 4 but illustrating a seal/slot interface.

In accordance with the exemplary embodiment of this invention, wear inserts 42 are attached inside of the transition piece end frame slot 38 to provide wear protection from conventional side and floating seals (one shown in FIG. 5 at 40). These inserts 42 are constructed preferably of a high temperature, wear resistant Cobalt based alloy material including about 20% Chromium and about 53% Cobalt. The seals 40 may be formed of a similar material. One particularly well suited material for the inserts 42 (and seals 40) is commercially known as L-605. Other alloys, however, having similar amounts of Chromium and Cobalt may also be suitable.

The inserts 42 are initially provided in sheet form, and then cut and bent to conform to the U-shaped slot 38. The U-shaped inserts 42 are secured within the slot 38 preferably by welding, and are located at positions in the slot where seal wear is experienced.

The number of inserts 42 fixed within the peripheral slot 38 can vary from four to eight, depending upon circumstances. For example, one insert along each of the horizontal portions 30, 32 and each of the side portions 34, 36 may suffice. Under other circumstances, it may be advantageous to also utilize corner inserts, thus raising the total number of inserts in the slot 38 from four to eight.

An alternative solution may include depositing weld build up material within the slot 38 having similar Chromium and Cobalt contents as the inserts 42. Still another alternative may include machining the slot 38 to a slightly greater width and then securing (e.g., by brazing) one or more cast inserts into the slot. Here again, the inserts would have similar Chromium and Cobalt contents as the previously described inserts 42.

By effectively increasing the hardness and thus the wear resistance of the slot 38 (via inserts 42), the wear previously within the NIMONIC-263 end frame slot is significantly reduced. Moreover, by careful selection of wear resistance and thickness of the materials utilized to construct the inserts 42, a majority of the wear experienced at the interface is imposed on the less expensive and easily replaceable slot protector inserts 42, and not on the considerably more complex and expensive transition piece 16 itself. As a result, maintenance intervals are increased and wear related repair costs are decreased.

Figure 6:
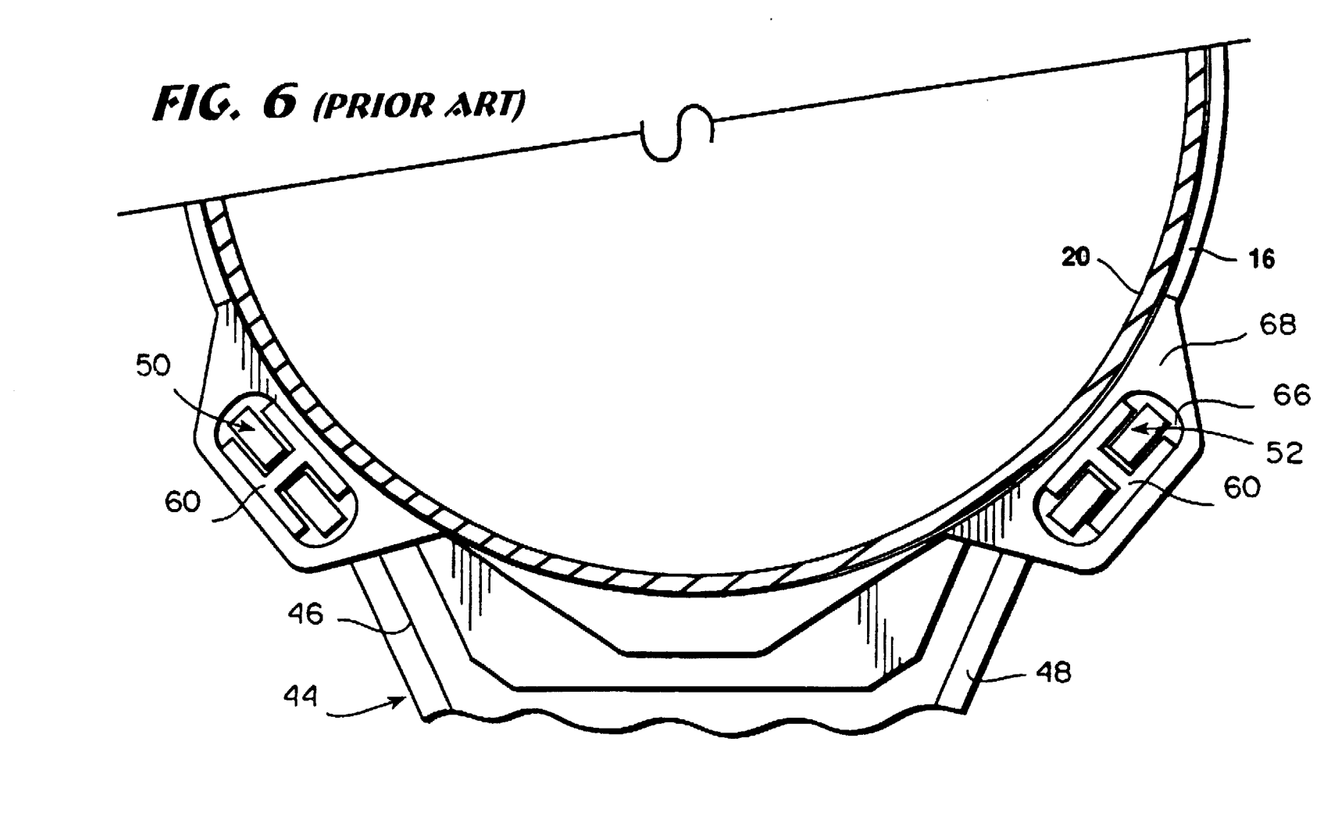
FIG. 6 is a partial section taken along the line 6—6 of FIG. 1.
Figure 7:
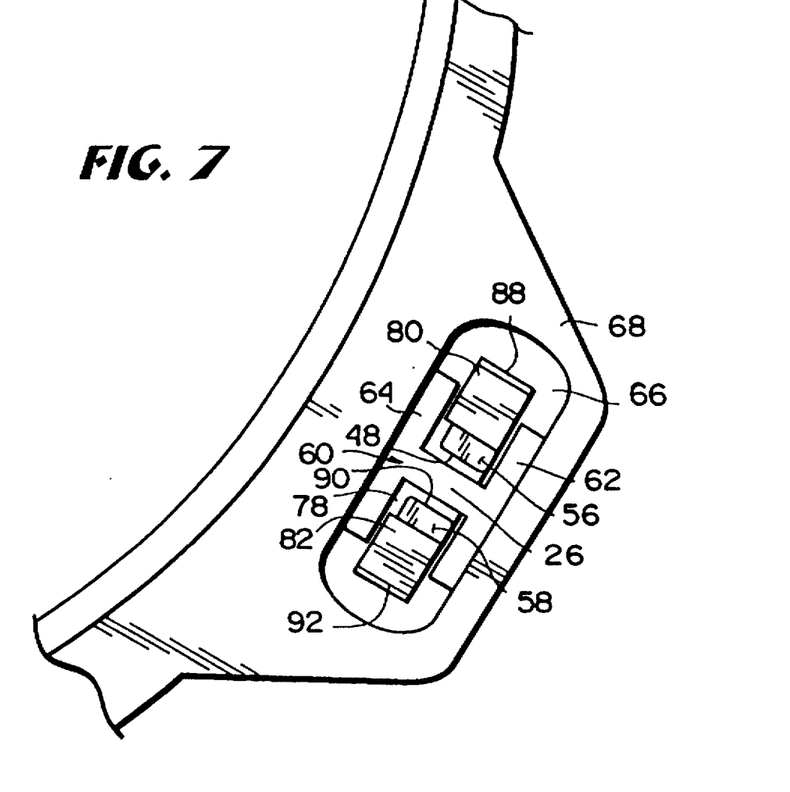
FIG. 7 is an enlarged detail taken from FIG. 6 and incorporating the features of this invention.
Figure 8:
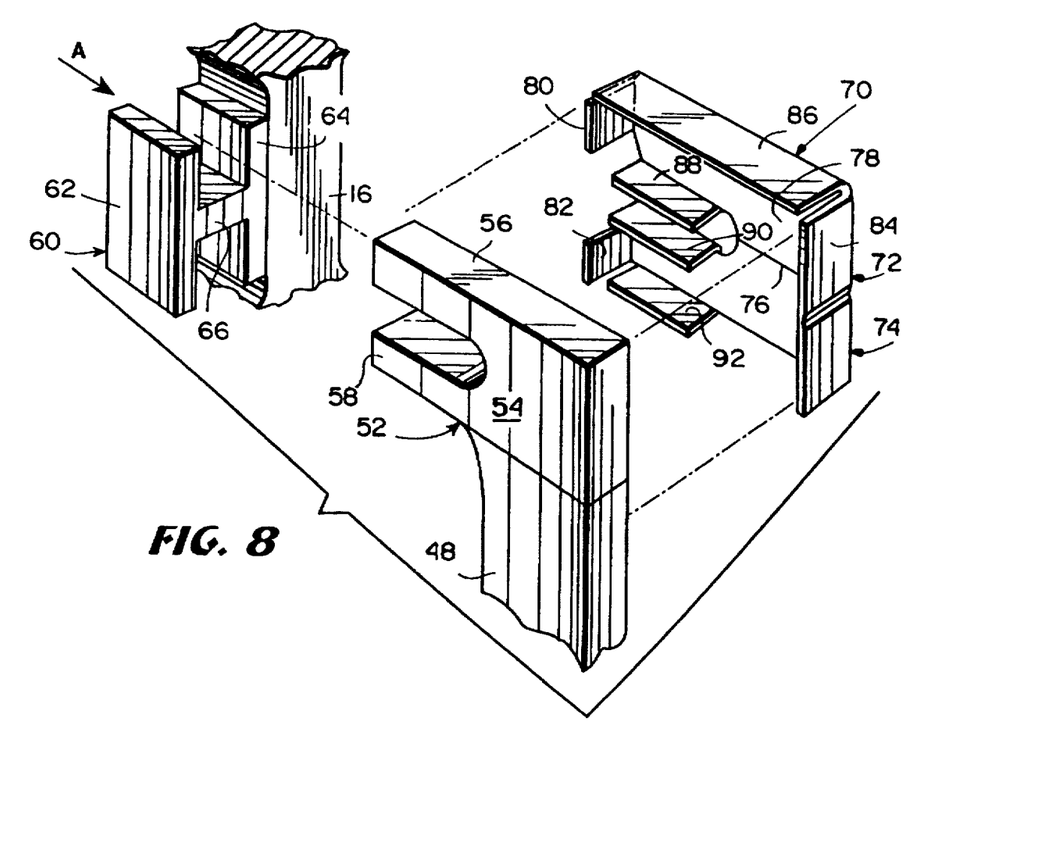
FIG. 8 is an exploded view illustrating the guide block and cooperating guide fingers in accordance with this invention.
Figure 9:
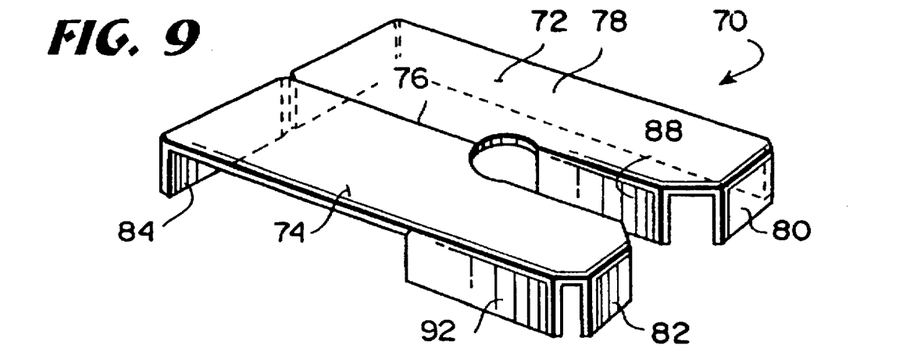
FIG. 9 is a perspective view of a guide finger wear cover in accordance with this invention.
Figure 10:
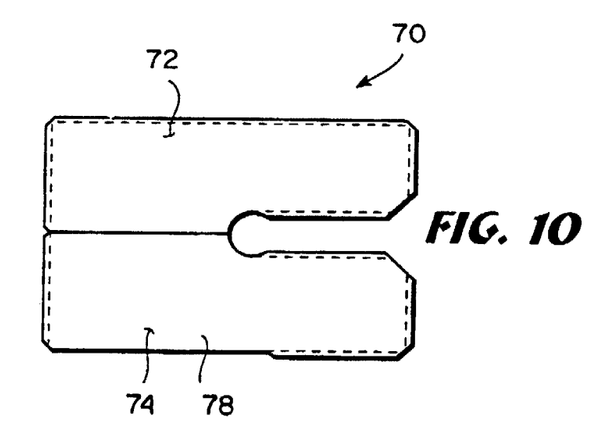
FIG. 10 is a front elevation of the cover illustrated in FIG. 9.
Figure 11:
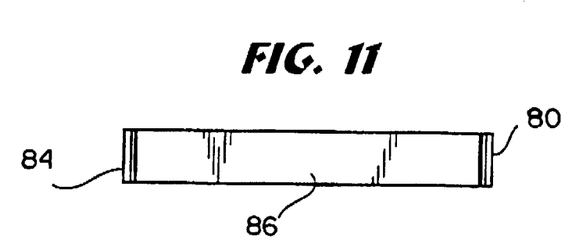
FIG. 11 is a top plan view of the cover illustrated in FIG. 10.
Figure 12:
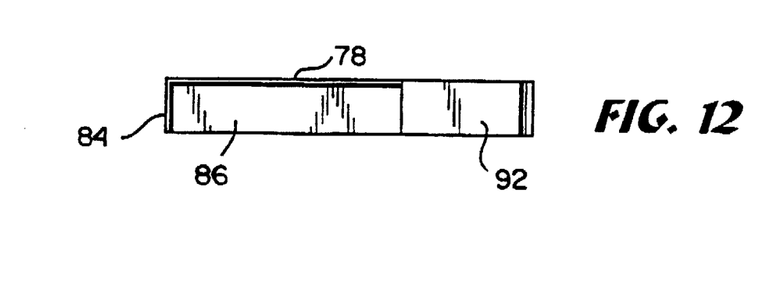
FIG. 12 is a bottom plan view of the cover illustrated in FIG. 10.
Figure 13:
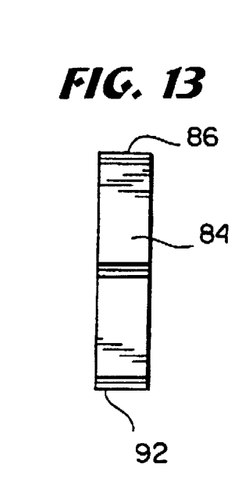
FIG. 13 is a left side view of the cover illustrated in FIG. 10.
Figure 14:
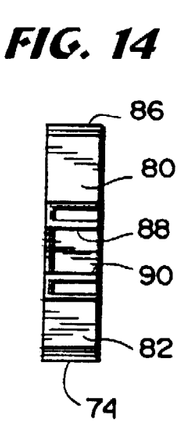
FIG. 14 is a right side view of the cover illustrated in FIG. 10.

With reference now generally to FIGS. 6–14, the transition piece 16 is also secured to the combustion liner 20 at an axially floating interface, i.e., the transition piece 16 is allowed to "grow" axially under the high temperature thermal conditions of an operating turbine. To this end, a forward support 44 is formed with a pair of arms 46, 48 which extend outwardly and upwardly to either side of the transition piece, as best seen in FIGS. 1, 6, 7 and 8. Each arm 46, 48 of the forward support 44 mounts an axially extending guide finger element 50, 52 (preferably welded thereto). Since these elements are identical, only one need be described in detail. The guide finger element 52 is typically constructed of a stainless steel and, as best seen in FIG. 8, includes a solid body portion 54 and a pair of axially extending, laterally spaced fingers 56, 58 extending axially away from the body portion 54. In use, as best seen in FIG. 1, the fingers 56, 58 extend axially in an upstream direction, i.e., towards the combustor and parallel to the longitudinal axes of the combustor. The forward support 44, with its outwardly and upwardly directed arms 46, 48 and guide fingers elements 50, 52 is sometimes referred to as a "bullhorn" and fingers 56, 58 are simply referred to as "bullhorn fingers".

The above described bullhorn fingers 56, 58 of the guide finger element 52 are designed to slidably engage an H-shaped guide block 60 welded to the exterior surface of the transition piece 16, relatively closely adjacent the upstream or combustor end thereof. A similar H-shaped guide block 60 is located for cooperating engagement with guide finger element 50 as shown in FIG. 6. Each block 60, as best seen in FIG. 8, comprises a pair of parallel stems 62, 64 and a cross-piece 66 which provide the H-shape. The block 60 is in fact welded along both exterior sides of the stems 62, 64 within an aperture 66 provided in a radially extending flange or ear 68 of the transition piece 16, as best seen in FIGS. 6 and 7.

It will be appreciated that in accordance with current practice, the bullhorn fingers 56, 58 are slidably received within the H-block 60 such that opposed facing surfaces of the finger elements engage opposite sides of the cross-piece 66. Moreover, it will be apparent from FIGS. 1 and 8 that the base of the slot defined by fingers 56, 58 serves as an axial stop, limiting axial movement of the transition piece 16 in a direction toward the turbine first stage 18.

According to current practice, the bullhorn fingers are constructed of stainless steel, and the H-blocks are constructed of an alloy known in the trade as HS-188.

In accordance with this invention, improved wear characteristics are provided at the interface of guide finger elements 50, 52 and cooperating guide blocks 60 by utilizing a harder, more wear resistant Cobalt-based alloy for the H-blocks 60, e.g., an FSX-414 alloy containing between 28.5 and 30.5% Chromium and about 52% Cobalt, and by providing a wear cover 70 for the bullhorn fingers 56 and 58 of each guide finger element. Thus, as shown in FIGS. 8–14, the bullhorn finger cover 70 is formed of two pieces of sheet material 72, 74 joined (as by welding) along a center seam 76 so as to provide covering surfaces for at least those corresponding vertical surfaces of bullhorn fingers 56, 58 which are most subject to wear. Thus, as best seen in FIGS. 7 and 8, flat, generally vertical surface portions 78, 80, 82 and 84 are arranged to cover corresponding surfaces on the guide finger element 52 including vertical end surfaces, the interior side surface (that side which is closest to the transition piece axis). It should be noted that vertical surface portions 80, 82 and 84 are not essential since the corresponding surfaces of the guide finger element 52 are not subject to wear. Nevertheless, these surface portions of the cover serve to properly locate the cover on the guide finger element. Surface portions 86, 88, 90 and 92 cover substantially all horizontal surfaces (relative to the orientation of FIG. 8) of the guide finger element, but again, surface portions 86 and 92 are provided primarily for locating the cover.

The bullhorn finger cover 70 is preferably constructed of the high temperature, wear resistant L-605 Cobalt-based alloy to provide increased wear resistance to the otherwise relatively soft guide fingers. The combination of FSX-414 and L-605 has been found to provide a good "wear couple"

which reduces overall wear at the interface of the H-blocks 60 and bullhorn guide finger elements 50, 52. Moreover, by this careful selection of the materials for the bullhorn fingers and cooperating H-blocks, wear patterns are caused to manifest themselves on the softer L-605 material, i.e., on a more easily replaceable/repairable and less costly component 70 (as compared to the transition piece and associated H-blocks 60).

In an alternative arrangement, the bullhorn finger elements 50 and 52 may be formed entirely of a high temperature, wear resistant alloy such as, for example, the L-605 alloy described above.

It will also be appreciated that other hard, wear resistant alloys having similar respective Chromium and Cobalt contents, may be used in accordance with the invention.

Returning now to FIG. 1, during assembly the combustion liner 20 is moved axially into the flow sleeve 22 from the nozzle end of the combustor 10 and a plurality of cooperating stop elements serve to locate the liner 20 within the flow sleeve 22 and to limit axial movement of the liner 20 within the sleeve in a direction toward the transition piece 16. The cooperating stop elements, shown generally at 94 in FIG. 1, will be described now in more detail, and with specific reference to FIGS. 15–17. Since each pair of cooperating stop elements is identical, only one pair need be described.

Figure 15:
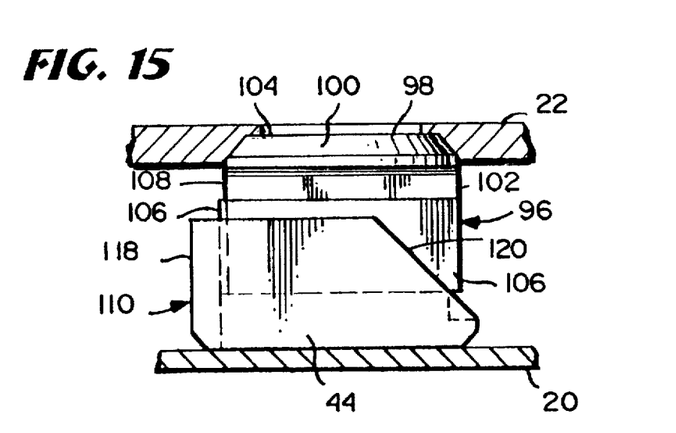
FIG. 15 is an enlarged detail illustrating cooperating combustion liner and flow sleeve stops in accordance with this invention.
Figure 16:
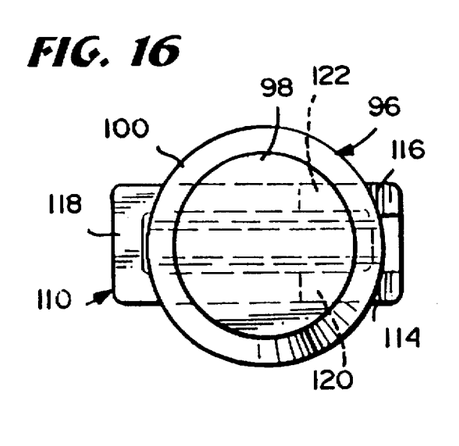
FIG. 16 is a plan view of the stops shown in FIG. 15.
Figure 17:
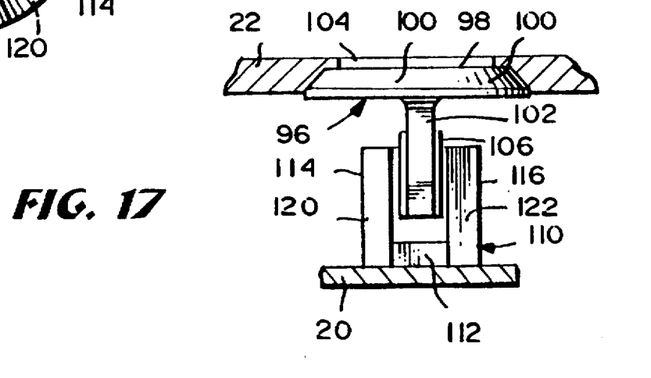
FIG. 17 is an end view of the stops shown in FIG. 15.

The flow sleeve stop element 96 (the male stop element), is substantially T-shaped in the orientation shown in FIG. 17, and includes a round disk-like head 98 formed with a bevelled peripheral edge 100. Stop 96 also includes an elongated stem 102 extending from the head 98. The stem 102 has an axial length dimension substantially equal to the diameter of the head 98, as best seen in FIG. 15. In conventional practice, the flow sleeve stop element 96 is welded within a counterbored hole 104 formed in the flow sleeve 22, and is oriented such that the elongated stem 102 has its length dimension oriented parallel to the longitudinal axes of the liner 20 and flow sleeve 22.

The flow sleeve stop element 96 is currently constructed of carbon steel and in accordance with this invention, the three sides of the elongated stem 102 are covered by a replaceable U-shaped strip 106 formed of a harder, wear resistant alloy sheet material including about 20% Chromium and about 53% Cobalt. The U-shaped strip 106 covers both elongated sides of the stem 102 as well as the upstream end or face 108, i.e., that surface defining the width dimension of the stem and facing the upstream or nozzle end of the liner 20. The U-shaped strip 106 may be spot welded to the stem 102 or otherwise suitably secured thereto. In the preferred embodiment, the alloy material selected for the U-shaped strip 106 is L-605, but other alloys with similar Chromium and Cobalt content may also be suitable.

It will also be appreciated that the stop stem 102 could be formed entirely of the harder, wear resistant L-605 Cobalt based alloy, or the latter material could be sprayed onto at least the stem 102. In still another alternative, such material could be applied the form of a weld build up.

The combustion liner stop 110 (the female stop element) is substantially U-shaped when viewed from an open front end as shown in FIG. 17, and includes a base surface 112 and a pair of laterally spaced side wall portions 114 and 116, thus forming a slot extending from a downstream end of the stop element to the upstream end of the stop element. The upstream end of the stop element is closed by a vertical wall 118. The downstream ends of the side wall portions 114 and 116 are machined to provide tapered surfaces 120, 122.

Liner stop elements 110 are welded to the combustion liner 20 at circumferentially spaced locations, for cooperating engagement with associated flow sleeve stop elements 96. It will be appreciated from FIG. 15, that as the combustion liner 20 is inserted axially within the flow sleeve 22, the liner 20 will move in a downstream direction toward the transition piece 16 until the vertical wall 118 of the liner stop element 110 engages the elongated stem 102, and specifically the end face 108 of the elongated stem 102 of flow sleeve stop element 96, thus precluding any further axial movement of the liner 20 toward the transition piece 16.

In the preferred embodiment, the liner stop 110 is now constructed of the FSX-414 alloy. This material is harder and more wear resistant than the previously employed HAST-X alloy, and is also harder than the alloy material of the U-shaped strip 106. The combination of, for example, FSX-414 and L-605 has been found to provide a good "wear couple" which reduces overall wear at the interface of stops 96 and 110. At the same time, however, because the FSX-414 material is harder than the wear strip 106, the wear that does occur at the interface will be exhibited on the replaceable U-shaped strip 106, and not on the liner stop 110. In other words, the majority of the wear appears predictably on the more easily repaired and/or replaced and less costly component, i.e., the flow sleeve stop. As a result, the combustion system reliability is enhanced, maintenance intervals are increased, and wear related costs are reduced.

In an alternative to that described above, an FSX-414 insert (of complementary U-shape) could be welded into the liner stop 110, or that same material could be applied in the form of a weld build up.

It will be appreciated that other alloys with similar Chromium and Cobalt weight percents similar to FSX-414 and L-605, may also be suitable.

The fuel nozzle 12 (FIG. 1) is provided at its forward tip 124 (FIG. 18) with a radially outer collar 126 (or air swirler) through which the compressor discharge air flows for enhanced mixing with fuel discharged from the nozzle orifice. The combustor system as described above is conventional in nature and, by itself, forms no part of the invention.

Figure 18:
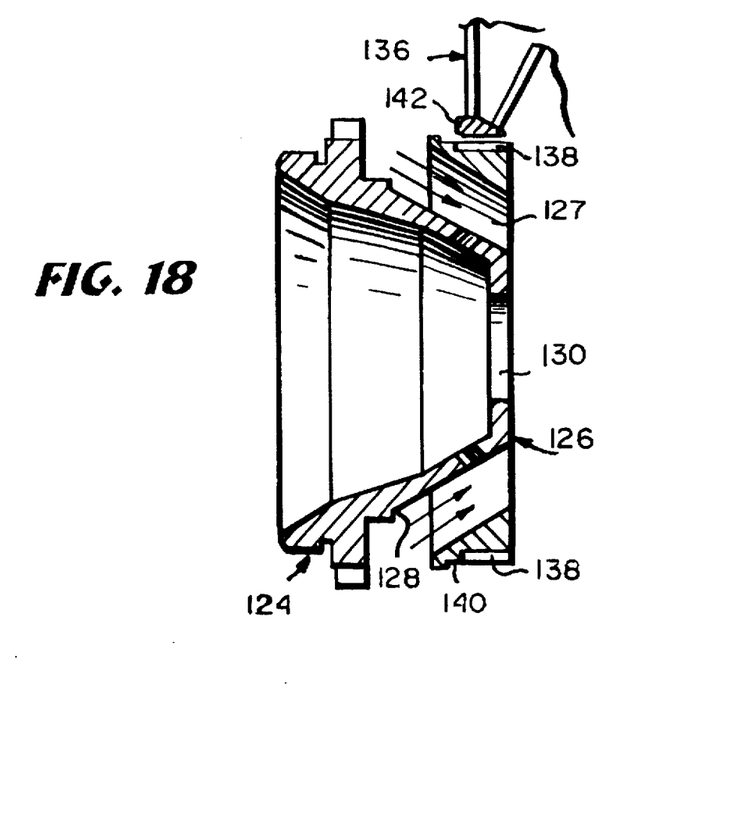
FIG. 18 is an enlarged detail taken from FIG. 1, illustrating the fuel nozzle/combustion liner interface.

Referring now to FIG. 18, the fuel nozzle tip 124 is shown to include a tapered body 128 including discharge orifice 130, and the radially outer collar or air swirler 126. The swirler 126 is designed to swirl combustion air flowing into the combustion chamber in the radially inclined passage 127 between the swirler 126 and the nozzle body 128.

The fuel nozzle 12 and related tip 124 are only partially shown in FIG. 18, with a major portion of the nozzle and internal components thereof omitted for the sake of simplicity and clarity. It will be understood that the internal parts and the manner of operation of the fuel nozzle also form no part of this invention. Rather, this invention is concerned with the interface between the fuel nozzle collar or swirler 126 and an associated combustion liner cap or cowl assembly 136.

In accordance with this invention, weld buildup material 138 is deposited on the peripheral surface 140 of the swirler 126. The weld material is deposited in continuous fashion (to a thickness greater than previously utilized spray-on coatings), and then machined to a smooth surface for engagement with a complementary surface on an annular mounting ring 142 of the combustor liner cap or cowl assembly 136.

Figure 19:
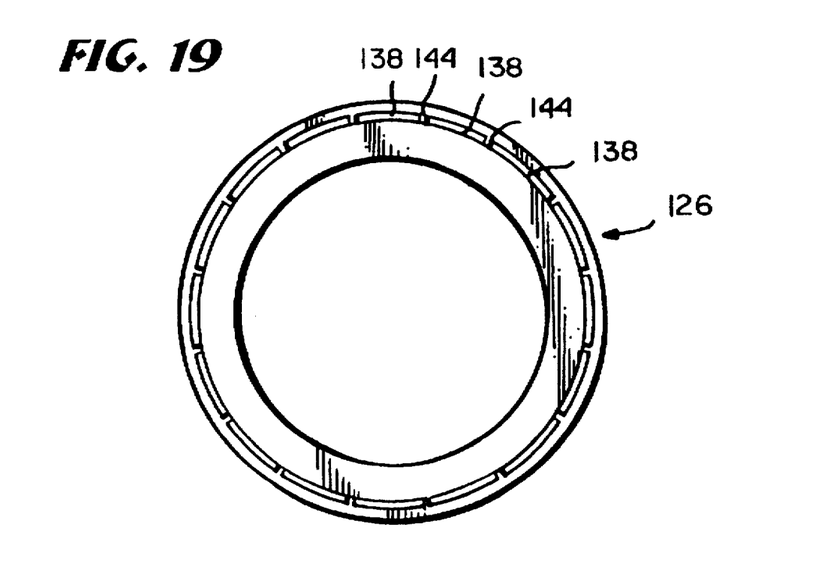
FIG. 19 is a front elevation of the outer collar section of the nozzle illustrated in FIG. 18.

With reference now to FIG. 19, the weld deposit material 138 is shown with a series of circumferentially spaced, axially extending gaps or cuts 144, machined into the weld deposit material 138. These gaps serve, in effect, as "pre-cracks" which accommodate differential thermal expansion coefficients between the weld material 138 and the nozzle collar or swirler 126.

In the exemplary embodiment, the annular combustor liner cap assembly mounting ring 142 is constructed of the high temperature, wear resistant, Cobalt-based FSX-414 alloy. Other alloys with similar Chromium and Cobalt content may also be employed. The weld deposit material 138 is also a Cobalt-based alloy with about 20% Chromium and about 53% Cobalt. One suitable alloy for material 138 is the L-605 alloy but other materials with similar amounts of Chromium and Cobalt percentages could also be used. Here again, the combination of FSX-414 and L-605 has been found to be a compatible "wear couple" and, when used together, reduces overall wear on the mating parts. Moreover, because L-605 is softer than FSX-414, most of the wear will occur on the nozzle collar 126, i.e., on the weld deposit, rather than on the mounting ring of the more complex and costly liner cap assembly 136.

It will therefore be appreciated that this aspect of the invention produces predictable wear patterns in less costly and more easily repairable components while at the same time effecting an overall reduction in wear at the liner cap assembly interface with the fuel nozzle tip collar.

Figure 20:
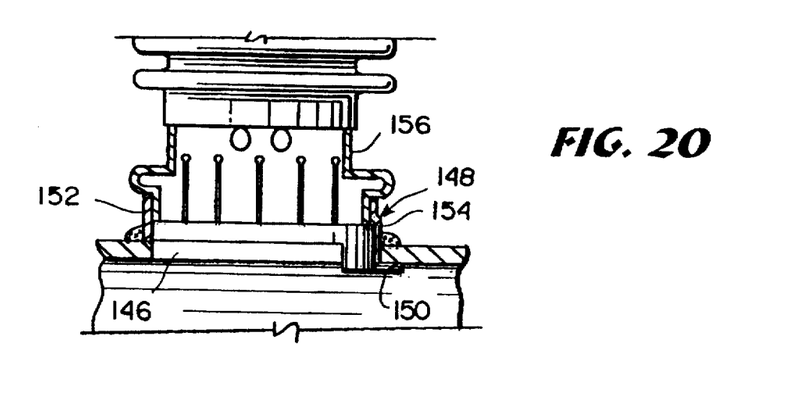
FIG. 20 is a partial section illustrating the conventional manner in which a crossfire tube is received within a combustion liner collar.

Referring to FIGS. 1 and 20–23, the combustion liner 20 is formed with a hole 146 in which is seated a crossfire tube collar 148 (see FIG. 20). The collar 148 is a substantially tubular boss, and includes a part annular, radial mounting flange 150 and a generally cylindrical body portion 152. The body portion 152 is formed with a diametrically enlarged portion 154 having a plurality of film cooling apertures (not seen in FIG. 2 but similar to apertures 231 in FIGS. 21 and 22) in accordance with conventional practice. Currently, the collar 148 is constructed of the Cobalt-based HS-188 alloy.

The crossfire tube 156 which is telescopically received within the liner has end portions which (see FIG. 2) may be constructed of a high temperature spring metal alloy known as X-750. The combination of HS-188 and X-750 materials at the crossfire tube/liner results in wear on both the crossfire tube 156 and on the liner crossfire tube collar 148 at the interface thereof where the tube 156 is telescopically received within the collar 148.

Figure 21:
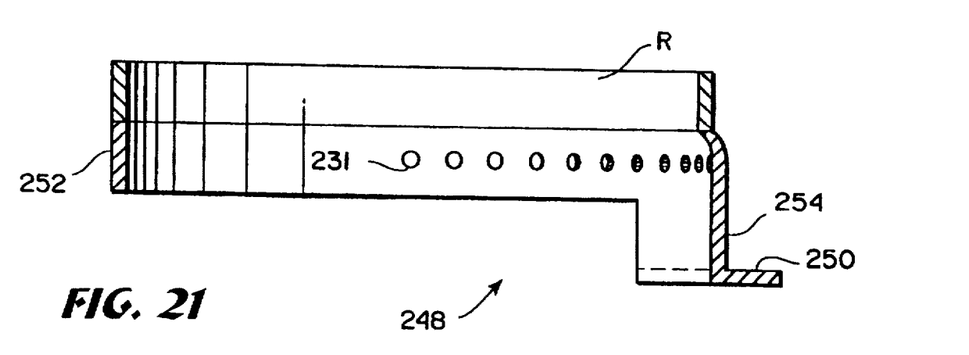
FIG. 21 is a cross section of a combustion liner collar in accordance with this invention.
Figure 22:
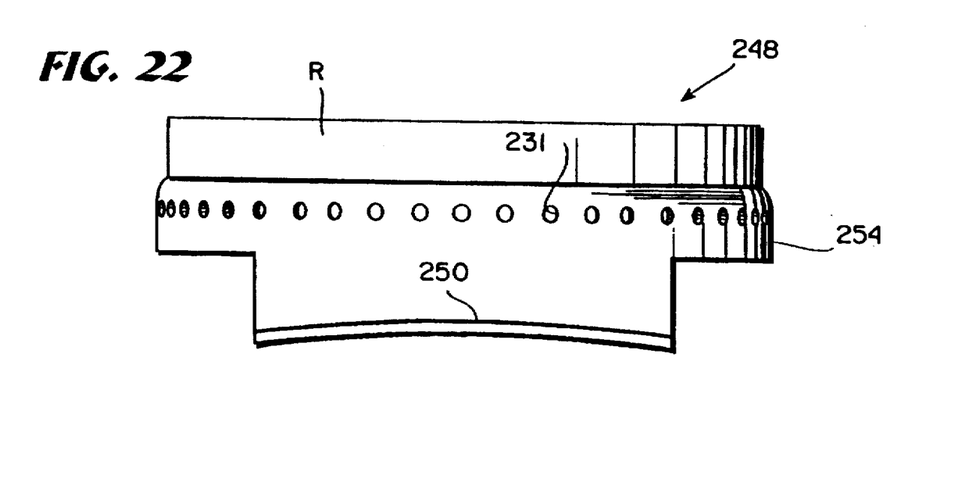
FIG. 22 is a side elevation of the combustion liner collar shown in FIG. 21.
Figure 23:
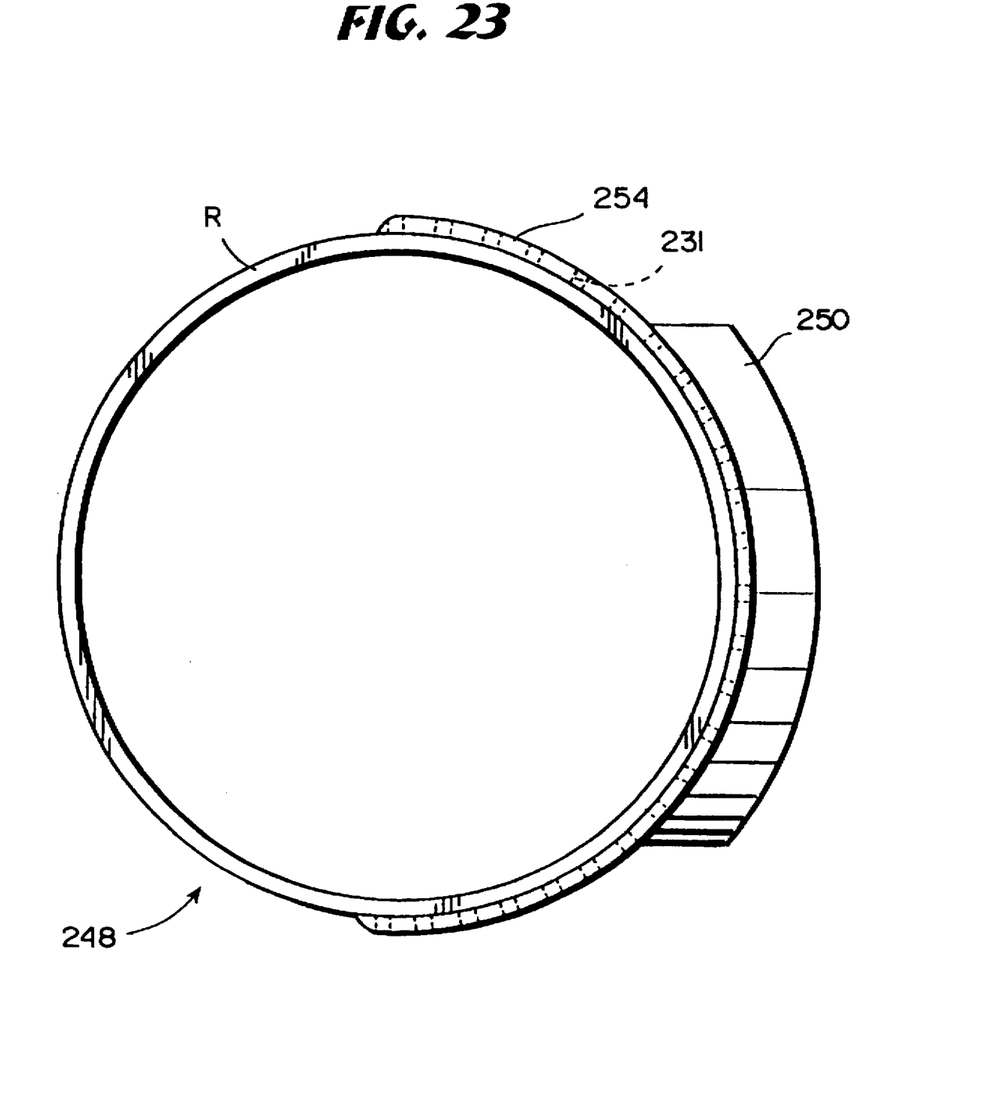
FIG. 23 is a plan view of the combustion liner collar shown in FIG. 22.

Reference is now made to FIGS. 21, 22 and 23 which illustrate a combustion liner collar in accordance with this invention. Similar reference numerals are used to designate corresponding elements but with the prefix "2" added.

In accordance with a preferred embodiment of this invention, the upper free end portion of the cylindrical body portion of the collar 248 is machined off (approximately ¼" in axial length), and an annular ring R of harder material is welded thereto. This ring R is constructed of a high temperature, wear resistant Cobalt-based alloy material which includes about 20% Chromium and about 53% Cobalt, and is thus harder than the X-750 crossfire tube end material. The use of this harder material serves to effect a reduction in overall wear experienced at the interface of the tube 156 and collar 248. Moreover, most of the wear experienced at the telescoping interface of the liner crossfire tube collar 248 and the crossfire tube 156 is predictably exhibited on the softer end of the crossfire tube. A particularly well suited crossfire tube construction for use with this invention is disclosed in commonly owned co-pending application Ser. No. 08/161,070 filed Dec. 3, 1993.

The preferred Cobalt-based alloy for the welded ring R is L-605, but other alloys with similar amounts of Chromium and Cobalt may also be suitable.

It will thus be appreciated that by judicious selection of wear resistant materials, and by predictably shifting most of the wear to a less expensive and more easily removable and replaceable component, i.e., the crossfire tube, inspection intervals can be lengthened and wear related repair costs reduced while enhancing the overall reliability of the combustion system.

For each of the above described combustor wear interfaces, solutions have been presented which extend the life of the combustion system in a relatively simple and cost effective manner. These solutions are manifested in a wear upgrade kit for gas turbine combustors which, depending on gas turbine model, may include one or more of the following components previously described:

(a) U-shaped wear inserts 42 for transition pieces;
(b) H-shaped guide blocks 60 and guide finger covers 70;
(c) combustion liner and flow sleeve stops 110, 96, respectively;
(d) liner cap assembly ring 142; and
(e) crossfire tubes 156 and collars 248.

For some wear upgrade kits, items (a) through (c) are included, and for others, items (d) and/or (e) are also included. The invention is not necessarily limited, however, to any particular number or combination of the wear components described herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wear reduction kit for a combustion system of a turbine comprising:

a) a plurality of U-shaped inserts for use with a gas turbine transition piece having a peripheral end frame at one end thereof, said peripheral end frame having a continuous U-shaped peripheral slot therein, open in a radially outward direction wherein said plurality of U-shaped inserts are sized and shaped for insertion within said peripheral slot, and further wherein said U-shaped inserts are formed of material having a hardness greater than said end frame;

b) at least a pair of substantially H-shaped guide block elements for use in securing a transition piece of a gas turbine combustor to a transition piece support, wherein each of said guide block elements is securable to said transition piece and adapted for engagement with a respective pair of cooperating guide finger elements secured to said support; and at least a pair of covers for said pair of guide finger elements, and wherein said guide block elements are formed of material having a hardness greater than said finger element covers; and c) cooperating combustor flow sleeve and combustor liner stop elements wherein the first stop element is adapted to be secured to a combustor flow sleeve and said liner stop element is adapted to be secured to a combustion liner, wherein said first and second stop elements have cooperating engagement surfaces, said engagement surfaces of said flow sleeve stop element having a hardness less than the engagement surfaces of said liner stop element.

2. The kit of claim 1 wherein said one or more U-shaped inserts comprise sheet material bent into a substantially U-shape.

3. The kit of claim 1 wherein said plurality of U-shaped inserts are formed of a Cobalt-based L-605 alloy.

4. The kit of claim 1 and further including a plurality of seals adapted to extend between the peripheral end frame and a turbine stage, said seals formed of a Cobalt-based L-605 alloy.

5. The kit of claim 1 wherein said guide block elements are constructed of a Cobalt-based FSX-414 alloy material which contains about 30% Chromium and 52% Cobalt.

6. The kit of claim 5 wherein said guide finger covers are formed of a Cobalt-based L-605 alloy wear resistant sheet material including about 20% Chromium and about 53% Cobalt.

7. The kit of claim 1 wherein said flow sleeve stop element includes an elongated stem and wherein said engagement surfaces of said flow sleeve stop element are defined by a substantially U-shaped wear strip, and further wherein said U-shaped wear strip is welded to said stem such that two sides and one end of said stem are engaged by said strip.

8. The kit of claim 7 wherein said liner stop is formed with a slot defined by a pair of side walls open at one end and closed at the other end, and wherein said U-shaped strip is oriented on said stem so as to engage said pair of said walls and said closed end of said slot.

9. The kit of claim 1 wherein said liner stop is constructed of a Cobalt-based FSX-414 alloy.

10. The kit of claim 9 wherein said strip is constructed of a Cobalt-based L-605 alloy.

11. The kit of claim 1 and further including a combustion liner collar adapted for receiving in telescoping engagement an end of a crossfire tube, said liner collar comprising a tubular body portion and a mounting flange, and an annular ring welded onto a free end of said body portion, said annular ring having a hardness greater than said body portion and greater than the end of the crossfire tube.

12. The kit of claim 11 and further including one or more crossfire tubes.

13. The kit of claim 1 and further including a combustion liner cap annular ring adapted for engagement with a fuel nozzle tip.

14. The kit of claim 13 wherein said combustion liner cap annular ring is formed of a Cobalt-based FSX-414 alloy.

* * * * *